US012680874B2

(12) United States Patent
Knoll et al.

(10) Patent No.: US 12,680,874 B2
(45) Date of Patent: Jul. 14, 2026

(54) VALIDATION OF DISPLAYS FOR DISPLAYING REFERENCE COLORS

(71) Applicant: X-RITE, INCORPORATED, Grand Rapids, MI (US)

(72) Inventors: Matthew Knoll, Grand Rapids, MI (US); Edward Hattenberger, East Aurora, NY (US)

(73) Assignee: X-RITE INCORPORATED, Grand Rapids, MI (US)

( * ) Notice: Subject to any disclaimer, the term of this patent is extended or adjusted under 35 U.S.C. 154(b) by 72 days.

(21) Appl. No.: 18/719,097

(22) PCT Filed: Dec. 12, 2022

(86) PCT No.: PCT/US2022/052572
§ 371 (c)(1),
(2) Date: Jun. 12, 2024

(87) PCT Pub. No.: WO2023/114148
PCT Pub. Date: Jun. 22, 2023

(65) Prior Publication Data
US 2025/0044155 A1     Feb. 6, 2025

Related U.S. Application Data

(60) Provisional application No. 63/288,837, filed on Dec. 13, 2021.

(51) Int. Cl.
*G01J 3/50*     (2006.01)
*G01J 3/52*     (2006.01)
*G06T 11/10*     (2026.01)

(52) U.S. Cl.
CPC ................. *G01J 3/506* (2013.01); *G01J 3/52* (2013.01); *G06T 11/10* (2026.01)

(58) Field of Classification Search
CPC ........... G01J 3/506; G01J 3/52; G06T 11/001; H04N 1/6033
See application file for complete search history.

(56) References Cited

U.S. PATENT DOCUMENTS

2022/0109781 A1* 4/2022 Morovic ............... G06F 3/1247

* cited by examiner

*Primary Examiner* — Thanh Luu
(74) *Attorney, Agent, or Firm* — Hahn Loeser & Parks, LLP

(57) ABSTRACT

A method for scoring color accuracy of color output devices relative to a set of discrete color standards comprises causing a color output device to generate a plurality of discrete colors; measuring the generated plurality of discrete colors; for each color measurement, determining color differences between the color measurement and corresponding reference spectral or colorimetric information for the discrete color standards; scoring the color output device based on weighted scores for color precision, average color difference between a generated discrete color and its corresponding target color, and highest individual color difference between a generated discrete color and its corresponding target color; and for each generated color, determining a closest matching discrete standard color by identifying the discrete standard color having the lowest color difference from the generated color's measurement.

12 Claims, 3 Drawing Sheets

| 5R | 4R | 3R | 2R | 1R | 1Y | 2Y | 3Y | 4Y | 5Y |
|---|---|---|---|---|---|---|---|---|---|
| | | | | | 1Y01 | 2Y01 | 3Y01 | 4Y01 | 5Y01 |
| | | | | 1R02 | 1Y02 | 2Y02 | 3Y02 | 4Y02 | 5Y02 |
| | | | 2R03 | 1R03 | 1Y03 | 2Y03 | 3Y03 | 4Y03 | 5Y03 |
| 5R04 | 4R04 | 3R04 | 2R04 | 1R04 | 1Y04 | 2Y04 | 3Y04 | 4Y04 | 5Y04 |
| 5R05 | 4R05 | 3R05 | 2R05 | 1R05 | 1Y05 | 2Y05 | 3Y05 | 4Y05 | 5Y05 |
| 5R06 | 4R06 | 3R06 | 2R06 | 1R06 | 1Y06 | 2Y06 | 3Y06 | 4Y06 | 5Y06 |
| 5R07 | 4R07 | 3R07 | 2R07 | 1R07 | 1Y07 | 2Y07 | 3Y07 | 4Y07 | 5Y07 |
| | 4R08 | 3R08 | 2R08 | 1R08 | 1Y08 | 2Y08 | 3Y08 | 4Y08 | 5Y08 |
| | 4R09 | 3R09 | 2R09 | 1R09 | 1Y09 | 2Y09 | 3Y09 | 4Y09 | 5Y09 |
| | | 3R10 | 2R10 | 1R10 | 1Y10 | 2Y1h0 | 3Y10 | 4Y10 | |
| | | 3R11 | 2R11 | 1R11 | 1Y11 | 2Y11 | 3Y11 | 4Y11 | |
| | | 3R12 | 2R12 | 1R12 | 1Y12 | 2Y12 | 3Y12 | | |
| | | 3R13 | 2R13 | 1R13 | 1Y13 | 2Y13 | | | |
| | 4R14 | 3R14 | 2R14 | 1R14 | 1Y14 | | | | |
| | 4R15 | 3R15 | 2R15 | 1R15 | | | | | |

100

Fig. 1

Table 1

| Scoring Factor | Base | Weight | Display 1 | | Display 2 | | Display 3 | | Display 4 | |
|---|---|---|---|---|---|---|---|---|---|---|
| | | | Result | Score | Result | Score | Result | Score | Result | Score |
| SkinTone Lowest Accuracy Index | 1.50 DE | 25% | 1.58 DE | 95% | 2.00 DE | 75% | 2.73 DE | 55% | 2.78 DE | 54% |
| SkinTone Average Accuracy Index | 0.50 DE | 25% | 0.53 DE | 95% | 0.67 DE | 75% | 0.91 DE | 55% | 0.93 DE | 54% |
| SkinTone Precision | 100% | 50% | 95.5% | 95% | 75.5% | 75% | 55.5% | 55% | 54.5% | 55% |
| | | Score: | Grade 1 95% | | Grade 2 75% | | Grade 3 55% | | Fail 54% | |

Fig. 2

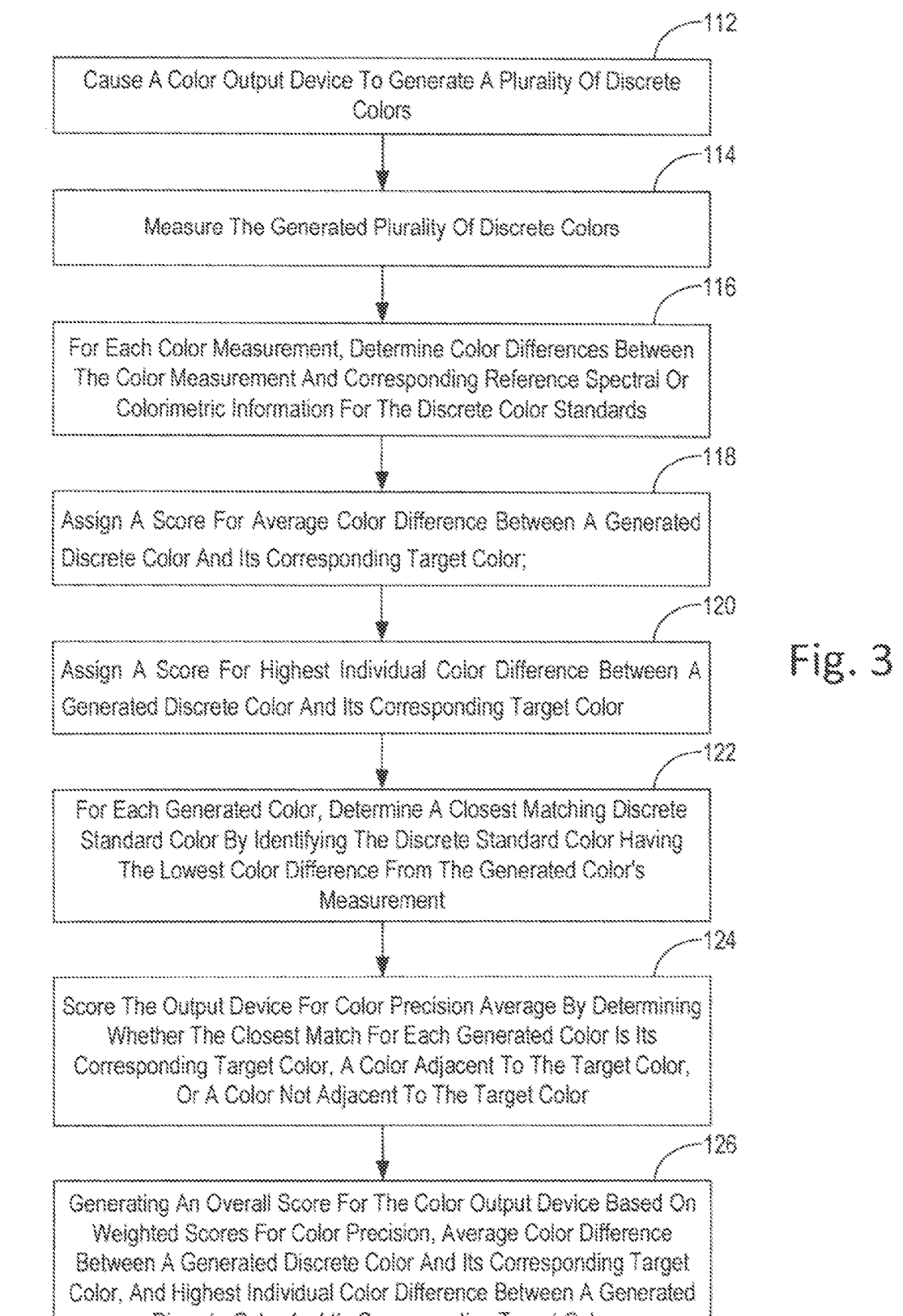

Fig. 3

112

Cause A Color Output Device To Generate A Plurality Of Discrete Colors

114

Measure The Generated Plurality Of Discrete Colors

116

For Each Color Measurement, Determine Color Differences Between The Color Measurement And Corresponding Reference Spectral Or Colorimetric Information For The Discrete Color Standards

118

Assign A Score For Average Color Difference Between A Generated Discrete Color And Its Corresponding Target Color;

110

120

Assign A Score For Highest Individual Color Difference Between A Generated Discrete Color And Its Corresponding Target Color

122

For Each Generated Color, Determine A Closest Matching Discrete Standard Color By Identifying The Discrete Standard Color Having The Lowest Color Difference From The Generated Color's Measurement

124

Score The Output Device For Color Precision Average By Determining Whether The Closest Match For Each Generated Color Is Its Corresponding Target Color, A Color Adjacent To The Target Color, Or A Color Not Adjacent To The Target Color

126

Generating An Overall Score For The Color Output Device Based On Weighted Scores For Color Precision, Average Color Difference Between A Generated Discrete Color And Its Corresponding Target Color, And Highest Individual Color Difference Between A Generated Discrete Color And Its Corresponding Target Color

VALIDATION OF DISPLAYS FOR DISPLAYING REFERENCE COLORS

BACKGROUND

Color accuracy is a highly important quality of color reproduction devices, including but not limited to printers, computer displays, televisions, smartphones, etc. Color accuracy is typically measured by causing a display or printer to reproduce a target color, measuring the target color as reproduced on the display or printer, and calculating a color difference between the reproduced color and target color, such as delta E. The lower the delta E, the higher the color accuracy. This may be repeated for multiple target colors and measurements. Sometimes, the displays are tested using target colors representative of a gamut of a standard color space, such as sRGB. Such testing and measurement can be effective for general-purpose color reproduction requirements.

Some specific color reproduction requirements exist where conventional testing and measuring of color displays and printers fails to provide adequate indications of color accuracy. For example, the Pantone® SkinTone™ Guide contains 110 distinct colors based on Pantone's research numbering thousands of skin tone measurements globally. All of the Pantone SkinTone Colors are within the gamut of almost all color displays and print devices. Indeed, the Pantone SkinTone Colors comprise a much smaller set of colors than, for example, a full sRGB color space, as little or no green or blue hues are present. Accordingly, testing of the full gamut of a display or printer may not yield information relevant as to whether the display at issue can accurately represent a set of discrete standard colors, such as skin tones.

In other examples, a set of discrete color standards comprises physically producible colors that are not limited to the color production capability of a color output device. Measuring discrete colors standards that are not constrained by the color production capability of a color output device thereby describes the limits of color production capability of the device. The limits of a given color output device may then be compared to the limits of other color output devices and the overall ability to achieve the full set of physically producible colors Realistic reproduction of the wide variety of skin colors is an important feature in entertainment, digital content creation, digital photography, cinematography, design and other on-screen applications. For example, accurate skin tone reproduction is recognized as being of critical importance to many in the film and television industries. What is needed is an objective process and system for validating whether displays/monitors and other color output devices can accurately and realistically reproduce a discrete set of standard colors, such as skin tones based on actual measurements of real people, as well as in other fields having limited sets of standard colors (for example medical evaluation of human tissue or scientific evaluation of soil or plants).

SUMMARY

A method for scoring color accuracy of color output devices relative to a set of discrete color standards is provided. The discrete color standards are represented in a two-dimensional array, each color standard comprising reference spectral or colorimetric information. The method comprises causing a color output device to generate a plurality of discrete colors, each generated discrete color having a corresponding target color within the set of discrete standard colors; measuring the generated plurality of discrete colors; for each color measurement, determining color differences between the color measurement and the reference spectral or colorimetric information for the discrete color standards; scoring the color output device based on weighted scores for color precision, average color difference between a generated discrete color and its corresponding target color, and highest individual color difference between a generated discrete color and its corresponding target color; and for each generated color, determining a closest matching discrete standard color by identifying the discrete standard color having the lowest color difference from the generated color's measurement. The score for color precision average comprises determining whether the closest match for each generated color is its corresponding target color, a color adjacent to the target color, or a color not adjacent to the target color in the two-dimensional array. In some embodiments, The score for color precision is weighted more heavily than either average color difference or highest color difference.

The generated plurality of the set of discrete standard colors may comprise the entire set of discrete standard colors.

The score for color precision may further comprise assigning a full score when the closest match is the target color, assigning a partial score when the closest match is an adjacent color, and assigning a score of zero when the closest match is a non-adjacent color.

In some embodiments, the color values in the two-dimensional array incrementally change in hue as a function of a first dimension of the array and the color values incrementally change in lightness in a second dimension of the array.

The standard colors that are diagonal to a target standard color in the two-dimensional array may be considered adjacent for purposes of color precision accuracy scoring.

The average color accuracy score may comprise an average color difference from target colors across all measured colors. The lowest color accuracy score may comprise a highest individual color difference from a target color within the plurality of measured colors.

The set of discrete color standards may comprise the complete set of Pantone SkinTone Colors. The set of discrete color standards may comprise the complete set of Pantone Formula Guide Coated Colors. The set of discrete standard colors comprise physically producible colors characterized by actual spectrophotometric data.

In some embodiments, the color differences are determined by calculating Delta E between a color measurement and the spectral or colorimetric information for each discrete color standard.

DESCRIPTION

One aspect of the present invention involves scoring a color display or printer against a set of discrete standard colors. The standard colors are discrete in the sense that each is visually perceptibly different from each other. One example of a set of discrete standard colors is represented in FIG. 1. The colors are represented by rectangular patches in a two-dimensional array, such as a grid. In some embodiments, the discrete standard colors represent measurements of skin tones. In the illustrated example, the discrete colors comprise the Pantone SkinTone colors. In the grid, the left-right axis corresponds to hue, typically, the amount of redness or yellowness in the skin tone. The up-down direction corresponds to lightness-darkness in the skin tone.

In some embodiments, the discrete standard colors are assigned locations on the array having dimensions of hue and lightness. The discrete standard colors are assigned identifiers. In the illustrated example, the degree of lightness is one dimension on the array and is assigned a number of 01 (light) to 15 (dark). An amount of redness/yellowness is a second dimension of the array, An amount of redness is designated by 1R to 5R, and a degree of yellowness is assigned a value of 1Y to 5Y. This results in designations, for example, 3R10, 1Y05, etc. The color differences between adjacent discrete standard colors are not necessarily a uniform difference. Determining the location of measured reproduced colors in the grid coupled with their color differences from their respective target colors adds an additional dimension of color accuracy not available from other scoring methods.

The grid need not be fully populated. For example, while a designation of 5R01 would be within the naming convention, such a color would not be representative of a measured human skin tone and is not part of the set of discrete standard colors.

The present invention is not limited to standard colors representing skin tones. The present invention may be advantageously used with additional sets of discrete standard colors, such as architectural paint palettes, scientific soil or plant palettes, medical tissue samples, achievable textile color palettes, achievable ink color palettes, the Pantone Formula Guide Coated Colors, the Munsell Book of Color, and the Munsell Nearly Neutrals Collection.

In some embodiments, to determine a display's accuracy in rendering a set of discrete standard colors, the display is operatively connected to a computer or other device that can send to the display signals or instructions to reproduce the set of discrete standard colors. In one example, the colors are reproduced one at a time. For example, a display may be connected to a computer including software to control the display by a HDMI, DisplayPort or other video cable, etc. As each color of the set of standard colors is rendered by the display, the rendered color is measured with, for example, a colorimeter. Other color measurement devices may be used for the measurement. The measured colors are recorded, for example, by software on the computer operatively coupled to the display.

The present invention is not limited to displays. For example, in some embodiments, a printing device is operatively coupled to the computer having software to generate the set of discrete standard colors in a two-dimensional grid. The computer and software will send signals, information, or instructions to the printer to print a test sheet including a plurality of the set of discrete standard colors. In one example, the printer is caused to print the grid of colors as illustrated in FIG. 1. Each of the printed colors is measured, for example, with a spectrophotometer or colorimeter, and the information is stored, for example, in the software.

In some embodiments, all the colors in the set of discrete standard colors are caused to be displayed, measured, and recorded. In some examples, a subset of the set of discrete standard colors are caused to be displayed, measured, and recorded. In some embodiments, control colors, control white, control black and control greys are displayed and measured. For example, control red (R=255, G=0, B=0), control green (R=0, G=255, B=0), and control blue (R=0, G=0, B=255) may be reproduced and measured on a display. For example, control cyan (C=100,M=0,Y=0,BK=0), control magenta (C=0,M=100,Y=0,BK=0), control yellow (C=0,M=0,Y=100,BK=0), control black (C=0,M=0,Y=0, BK=100) and control white (C=0,M=0,Y=0,BK=0) may be reproduced and measured on a printer. The control colors are not included in the scoring algorithm, but may be useful in determining why a display or printer is scoring poorly. For example if a neutral ramp is off, most likely there is an imbalance in the primaries which would cause an issue with skin tones as well as other colors.

In some embodiments, scoring of the recorded display or print output is based on three factors: 1) standard color precision; 2) standard color average accuracy; and 3) standard color lowest accuracy.

The standard color precision factor is determined as follows. The measured colorimetric or spectral output for the display or print device being evaluated is resolved to its closest match in the set of discrete standard colors. The closest match color is then compared to the target color that the display or print device was instructed to render. For example, the software may instruct the display or print device to render the color associated with 2R10. The measurement of this displayed/printed target color is likely to have some variation from the reference data for the target color, so the measurement is compared to the colorimetric or spectral information for all the standard colors (or at least 2R10 and its neighboring standard colors) and the closest match is selected. In some embodiments, the closest match is determined by calculating a color difference from the measured reproduced color to all the standard colors, and the standard color having smallest color difference with respect to the measurement is considered the closest match. In some embodiments, Delta E is calculated to determine the color differences. If the closest match is 2R10 (the target standard color), then this is considered an exact match, even if there is some minor variation from the standard color. If the closest match is an adjacent color on the 2D grid, for example 2R09, this is considered an adjacent match in terms of precision. If the closest match to the measurement is more than one color away from the target, for example, 2R08, this is considered a non-adjacent match. In some embodiments, standard colors located diagonally from the target standard colors (e.g, 1R09 in this example) are considered adjacent colors for the purposes of this scoring.

In some embodiments, each exact match for a precision measurement scores 100%, each adjacent match scores 50%, and each non-adjacent match scores 0%. An average score is then determined. For example a set of measurements resulting in 90 exact matches, 5 adjacent, and 5 non-adjacent, results in a score of 92.5%. In another example, each exact match for a precision measurement scores one point, each close match scores a half a point, and each non-match scores no points. The points are summed, and an overall percentage is calculated. In some examples, the average standard color precision factor is weighted as half of the score result.

The standard color average accuracy factor (or average lowest color difference factor) evaluates the average color difference for all of the rendered and measured discrete standard colors compared to the target discrete standard color colorimetric or spectral data. In some embodiments, DE2000 is used to determine the average color difference. In one example, the target is 0.5 delta E. A display or printer having an average delta E of 0.50 or lower is scored at 100%. Delta E averages more than 0.50 are scored are lower than 100%, with scores decreasing with increasing average Delta E. At some point the value becomes so small (e.g., Delta E of 12 or more) that it essentially contributes zero to the overall score. Standard color average accuracy is weighted as one quarter (25%) of the score result.

The lowest individual accuracy factor (or highest individual color difference factor) evaluates the maximum color difference for all reproduced colors compared to their respective target colors in the standard color data. In some embodiments, DE2000 is used to determine the maximum color difference. In some embodiments, a target for maximum color difference is 1.5 Delta E or lower. Displays and printers having a maximum color difference from a measured reproduced color to its corresponding target not exceeding 1.5 DE are scored as 100%. Devices having maximum Delta E over 1.50 are scored are lower than 100%, with scores decreasing with increasing maximum Delta E. The lowest accuracy factor is weighted as one quarter of the score result. Scoring examples are provided in Table 1 (FIG. 2).

In one example in Table 1, Display 1 has a skin tone precision score of 95.5%. The skin tone average accuracy index is 0.53 DE, just above the target of 0.50 DE, and results in a score of 95%. The skin tone lowest accuracy index is 1.58 DE, once again, just above the target of 1.50 DE, and again results in a score of 95%. These scores are weighted as shown in Table 2 and the cumulative score is 95%. Output devices scoring 95% or better are ranked Grade 1.

Additional output devices are measured and scored as shown in Table 1. Devices scoring 75% to 95% are ranked Grade 2. Devices scoring 55% to 75% are ranked Grade 3. Devices scoring below 55%—are ranked Fail.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP stack protocols, FTP, SMB, OSI, HTTP-based protocols, SSL, Bitcoin, Ethereum, blockchain- or smart contracts-supported protocols. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self-organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically or optically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices may also include one or more software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by one or more of the method, system, or device. Program modules, program components and/or programmatic objects may include computer-readable and/or computer-executable instructions, for example computer-executable instructions comprising a programmatic description of one or more of the methods, of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

Embodiments of the present disclosure, for example, one or more of the computing systems, comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes or methods described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes or methods, including one or more of the processes or methods described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A digital communication interface, or network, is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method for scoring color accuracy of color output devices relative to a set of discrete color standards represented in a two-dimensional array, each color standard comprising reference spectral or colorimetric information, the method comprising:
   causing a color output device to generate a plurality of discrete colors, each generated discrete color having a corresponding target color within the set of discrete standard colors;
   measuring the generated plurality of discrete colors;
   for each color measurement, determining color differences between the color measurement and the reference spectral or colorimetric information for the discrete color standards;
   scoring the color output device based on weighted scores for color precision, average color difference between a generated discrete color and its corresponding target color, and highest individual color difference between a generated discrete color and its corresponding target color;

for each generated color, determining a closest matching discrete standard color by identifying the discrete standard color having the lowest color difference from the generated color's measurement;
   wherein the score for color precision average comprises determining whether the closest match for each generated color is its corresponding target color, a color adjacent to the target color, or a color not adjacent to the target color in the two-dimensional array.

2. The method of claim 1, wherein the generated plurality of the set of discrete standard colors comprises the entire set of discrete standard colors.

3. The method of claim 1 wherein the score for color precision is weighted more heavily than either average color difference or highest color difference.

4. The method of claim 1, wherein the score for color precision further comprises assigning a full score when the closest match is the target color, assigning a partial score when the closest match is an adjacent color, and assigning a score of zero when the closest match is a non-adjacent color.

5. The method of claim 1, wherein the color values in the two-dimensional array incrementally change in hue as a function of a first dimension of the array and the color values incrementally change in lightness in a second dimension of the array.

6. The method of claim 5, wherein standard colors that are diagonal to a target standard color in the two-dimensional array are considered adjacent for purposes of color precision accuracy scoring.

7. The method of claim 1, wherein the average color accuracy score comprises an average color difference from target colors across all measured colors.

8. The method of claim 1, wherein the lowest color accuracy score comprises a highest individual color difference from a target color within the plurality of measured colors.

9. The method of claim 1, wherein the set of discrete color standards comprises the complete set of Pantone SkinTone Colors.

10. The method of claim 1, wherein the set of discrete color standards comprises the complete set of Pantone Formula Guide Coated Colors.

11. The method of claim 1, wherein the set of discrete standard colors comprise physically producible colors is characterized by actual spectrophotometric data.

12. The method of claim 1, wherein the color differences are determined by calculating Delta E between a color measurement and the spectral or colorimetric information for each discrete color standard.

* * * * *